No. 704,680. Patented July 15, 1902.
W. GOODBRAND.
TWO-SPEED DRIVING GEAR FOR BICYCLES.
(Application filed Feb. 12, 1902.)
(No Model.) 2 Sheets—Sheet 1.
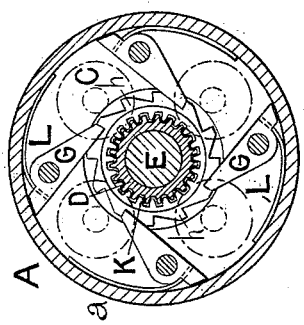
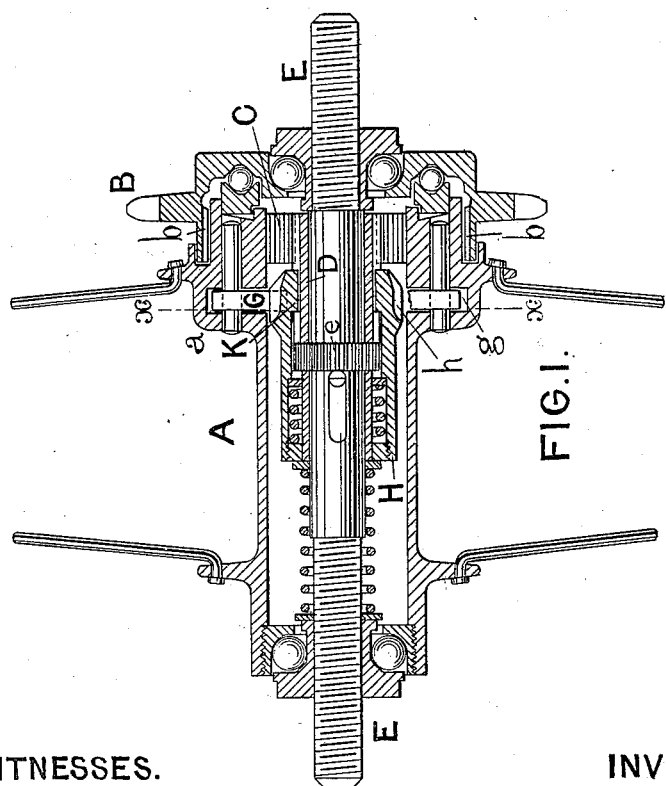
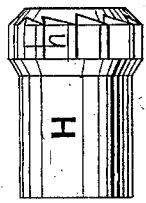
WITNESSES. INVENTOR.

No. 704,680. Patented July 15, 1902.
W. GOODBRAND.
TWO-SPEED DRIVING GEAR FOR BICYCLES.
(Application filed Feb. 12, 1902.)
(No Model.) 2 Sheets—Sheet 2.
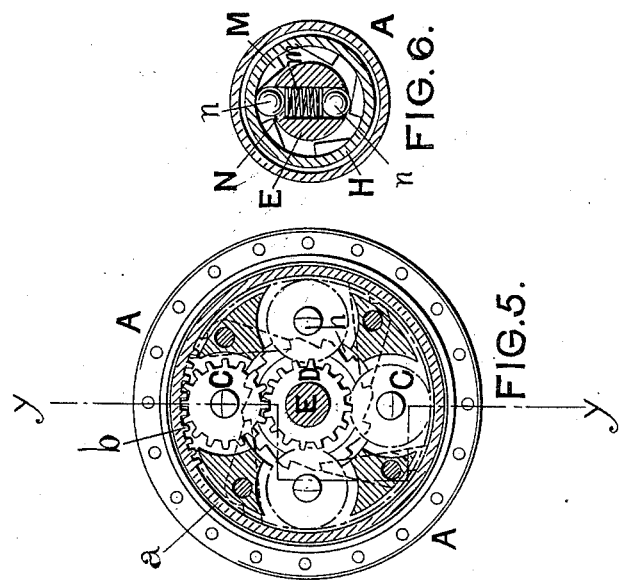
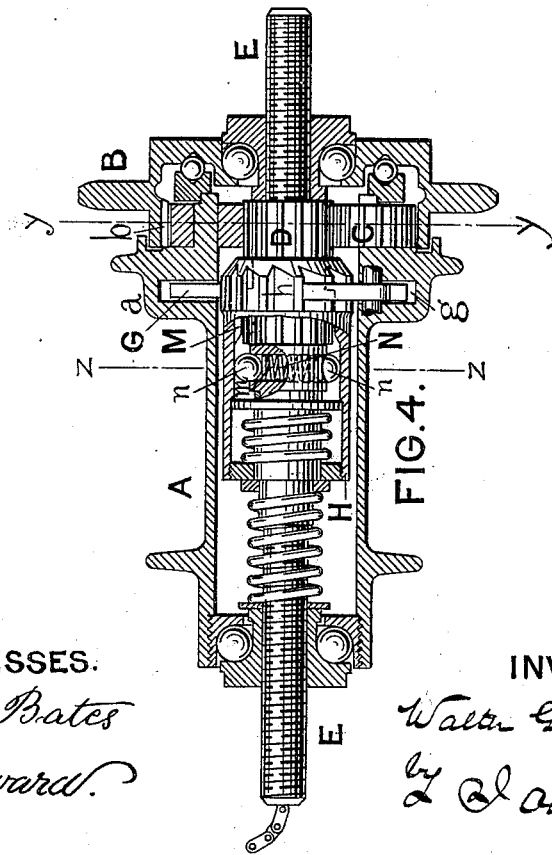
WITNESSES.
Joseph Bates
E. Howard
INVENTOR.
Walter Goodbrand
by Edward O'Brien
atty
THE NORRIS PETERS CO., PHOTO-LITHO., WASHINGTON, D. C.

UNITED STATES PATENT OFFICE.

WALTER GOODBRAND, OF MANCHESTER, ENGLAND.

TWO-SPEED DRIVING-GEAR FOR BICYCLES.

SPECIFICATION forming part of Letters Patent No. 704,680, dated July 15, 1902.

Application filed February 12, 1902. Serial No. 93,808. (No model.)

*To all whom it may concern:*

Be it known that I, WALTER GOODBRAND, a British subject, and a resident of Manchester, in the county of Lancaster, England, have invented certain new and useful Improvements in Two-Speed Driving-Gear for Bicycles, of which the following is a specification.

This invention relates to variable-speed gears for cycles contained in the hub of the driving-wheel, such as are known as "hub two-speed gears" and described in the specifications of Patents No. 588,657, of 1897, and No. 698,132, of 1902, of the United States, and is designed to provide a constant free wheel whether the gear be on the high speed or the low speed.

In the two-speed gear hitherto designed what is known as the "free-wheel motion"—that is, the continuous revolution of the wheel while the cranks and pedals remain stationary—has been obtained when the changing mechanism is between or out of gear with both the high and low gears, or it has been obtained by constructing the sliding clutch in two parts and inserting ratchet and pawls between the parts.

This invention consists essentially in constructing the sliding clutch or sleeve (described in the specifications of the former patents, No. 588,657, of 1897, and No. 698,132, of 1902) by which the gear is altered from one speed to the other with external ratchet-teeth and forming the hub with an extension or swell, and a groove cut therein in which a number of pawls are inserted to engage with the ratchet-teeth on the sleeve. To provide a free-wheel motion on the low gear, also in constructing the sleeve with ratchet-shaped teeth internally to engage with a ratchet device inserted in the spindle which permits of rotation around the spindle freely in one direction. It will be fully described with reference to the accompanying drawings.

Figure 1 is a longitudinal sectional elevation of hub and gear, showing the invention in its simpler form to provide a free-wheel motion when running on the high speed only; Fig. 2, a transverse section of same on line $xx$, Fig. 1; Fig. 3, an elevation of the sleeve detached; Fig. 4, a longitudinal sectional elevation of hub and gear, showing the invention constructed to provide free-wheel motion, both on the high and low speeds; Fig. 5, a transverse section of same on line $yy$, Fig. 4; Fig. 6, a transverse section on line $zz$, Fig. 4.

The hub A is specially constructed, as hereinafter described; but the chain-wheel B, with internal teeth $b$, the planetary pinions C, and the pinion D, rotating on the spindle E, are constructed and operate as shown. The hub A is now constructed with an extension or swell $a$, in which is cut or formed a groove $g$ behind the planetary pinions C, and in this groove $g$ I pivot a number of—say four—pawls G, which take the place of the teeth or projections in the former patents. The sliding clutch or sleeve H is now formed with external ratchet-teeth $h$, tapering to the end, instead of with pinion teeth or projections, and with the ratchet-teeth the pawls G engage when the internal teeth K are free or out of engagement with the teeth $e$ on the spindle E. When, therefore, the hub is being driven forward, the clutch H being in the position to gear with the pawls G, (shown in Fig. 1,) which is known as the "high-gear position," it is possible to retard or stop the chain-wheel B and the cranks or pedals driving the hub while the hub A and the wheel to which the hub A is fitted still continue their rotative movement. On again rotating the chain-wheel B the hub A will be again driven forward. The action is as follows: While the chain-wheel B is held stationary and the hub A continues to revolve, the planetary pinions C are rotated on their axes by the annular teeth $b$ of the stationary chain-wheel B. They in turn rotate the central pinion D and it rotates the clutch or sleeve H (through the medium of its internal clutch-teeth K) in the same direction as the hub A, but at an increased speed. Consequently the pawls G will not engage the ratchet-teeth $h$ of the clutch H, and consequently offer no resistance thereto, but permit the hub A to revolve freely independently of the chain-wheel B, which stands at rest. On bringing rotative pressure to bear on the chain-wheel B the clutch H tends to rotate in the opposite direction to the chain-wheel B, therefore engaging the pawls G, which prevent the rotation of the clutch H in relation to the hub A, which in turn prevents the planetary pinions revolving, the whole of the mechanism thus becoming locked and driving the hub A as a solid mass with the chain-wheel B.

The ratchet-teeth $h$ are tapered, so as to slide backward and forward into and out of engagement with the pawls G as the sleeve or clutch H is moved backward and forward to engage or disengage the teeth $e$ on the spindle E.

When the clutch is in gear with the teeth $e$, the pawls G are out of gear with the ratchet-teeth $h$. The springs L hold the pawls in position against the teeth.

By a modified construction the free-wheel motion is also applied to the "hub two-speed gear" when the gear is on the low speed. (See Figs. 4, 5, and 6.) The sliding sleeve or clutch H is in this case provided with internal teeth M of ratchet shape. The teeth $e$ are removed from the spindle E and a ratchet device N substituted, which when the sleeve is drawn back engage the internal ratchet-teeth M therein, so that the sleeve is free to rotate in one direction over the stationary spindle E.

The ratchet device N comprises one or two sliding pieces $n$, placed in a hole drilled in the spindle, preferably spherical, forced outward by a spring $m$. The sliding pieces $n$ are forced inward against the pressure of the spring $m$ by the action of the teeth M when moving backward. When therefore the chain-wheel B is stopped or running more slowly than the hub A, the ratchet-teeth M depress the friction-pieces $n$ and run over or past them.

What I claim as my invention, and desire to protect by Letters Patent, is—

1. In a hub two-speed gear the combination with the chain-wheel, planetary pinions, and stationary spindle, of a hub provided with a groove and pawls pivoted therein, and a sliding clutch provided externally with ratchet-teeth to engage the pawls, which when the chain-wheel is in action lock the mechanism through the medium of planetary pinions, and revolving hub, and prevent the rotation of the sliding clutch in relation to the hub, and which when the chain-wheel is out of action permit the hub to rotate around the clutch, substantially as described.

2. A hub two-speed gear comprising in its construction a chain-wheel with internal teeth, planetary pinions on the hub gearing therewith, a pinion loose on the spindle, engaging planetary pinions, a stationary spindle, on which the hub and loose pinions are placed, a clutch sliding on the spindle provided with external ratchet-teeth, a hub provided with a groove to carry the pawls, and pawls pivoted therein to engage the ratchet-teeth on the sleeve substantially as and for the purpose described.

3. In a hub two-speed gear, the combination with the chain-wheel planetary pinions, engaging therewith, a stationary spindle and a hub, pawls pivoted to the said hub to which the planetary pinions are pivoted, of a clutch sliding on the spindle provided with external ratchet-teeth to engage the said pawls, and provided also with internal ratchet-teeth and a ratchet device inserted in a hole in the said spindle to engage the internal ratchet-teeth substantially as and for the purpose described.

In witness whereof I have hereunto signed my name, in the presence of two subscribing witnesses, this 28th day of January, 1902.

WALTER GOODBRAND.

Witnesses:
J. OWDEN O'BRIEN,
B. TATHAM WOODHEAD.